US012631201B2

(12) United States Patent
Nauman

(10) Patent No.: US 12,631,201 B2
(45) Date of Patent: May 19, 2026

(54) VARIABLE RELIEF CIRCUIT

(71) Applicant: HUSCO International, Inc., Waukesha, WI (US)

(72) Inventor: Levi Nauman, Waukesha, WI (US)

(73) Assignee: HUSCO International, Inc., Waukesha, WI (US)

( * ) Notice: Subject to any disclaimer, the term of this patent is extended or adjusted under 35 U.S.C. 154(b) by 39 days.

(21) Appl. No.: 18/203,594

(22) Filed: May 30, 2023

(65) Prior Publication Data

US 2023/0383769 A1 Nov. 30, 2023

Related U.S. Application Data

(60) Provisional application No. 63/346,528, filed on May 27, 2022.

(51) Int. Cl.
*F15B 11/02* (2006.01)

(52) U.S. Cl.
CPC ..... *F15B 11/02* (2013.01); *F15B 2211/50518* (2013.01); *F15B 2211/5151* (2013.01); *F15B 2211/526* (2013.01)

(58) Field of Classification Search
CPC ............ F15B 11/02; F15B 2211/50518; F15B 2211/5151; F15B 2211/52
See application file for complete search history.

(56) References Cited

U.S. PATENT DOCUMENTS

| | | | |
|---|---|---|---|
| 2,851,564 A | 9/1958 | Zimmerman | |
| 3,174,410 A | 3/1965 | Booth et al. | |
| 3,180,355 A | 4/1965 | Long | |
| 3,515,165 A | 6/1970 | Zadoo | |
| 3,578,019 A | 5/1971 | Turolla | |
| 3,593,741 A | 7/1971 | Wombach et al. | |
| 3,677,287 A | 7/1972 | Morris | |
| 3,752,174 A | 8/1973 | Turolla | |
| 4,062,374 A | 12/1977 | Marshall et al. | |
| 4,135,541 A | 1/1979 | Lorimor | |
| 4,336,903 A | 6/1982 | Zirps | |
| 4,501,291 A * | 2/1985 | Siegrist | F16K 17/06 251/63.4 |
| 4,735,056 A * | 4/1988 | Goodman | B64D 13/08 236/80 A |
| 4,896,694 A | 1/1990 | Rausch | |
| 6,986,362 B2 | 1/2006 | Cheong | |

(Continued)

OTHER PUBLICATIONS

Case Construction, 580N, 580SN WT, 580SN, 590SN, Tier 4B (Final), Tractor Loader Backhoe, Service Manual, Part No. 47830958, 2015, pp. 1200, 1336-1337.

*Primary Examiner* — Angelisa L. Hicks
(74) *Attorney, Agent, or Firm* — Quarles & Brady LLP

(57) ABSTRACT

A relief circuit is operable between a first state and a second state to allow different functions of a hydraulic system to relieve at different pressures. In the first state of the relief circuit, the relief circuit is configured so that each of the functions of the hydraulic system relieve at the same pressure. In the second state of the relief circuit, the relief circuit is configured so different functions of the hydraulic system can operate simultaneously while also relieving at different pressures. In particular, a first function relieves at a first pressure and a second function relieves at a second pressure that is higher than the first pressure.

20 Claims, 2 Drawing Sheets

(56) References Cited

U.S. PATENT DOCUMENTS

| | | | | |
|---|---|---|---|---|
| 7,467,642 | B2 | 12/2008 | Prinsen et al. | |
| 8,020,583 | B2 | 9/2011 | Christensen et al. | |
| 8,365,763 | B2 | 2/2013 | Woelfges | |
| 8,434,508 | B2 * | 5/2013 | Terada | F16K 17/08 137/538 |
| 10,564,652 | B2 | 2/2020 | Mueller et al. | |
| 10,989,231 | B2 * | 4/2021 | Wechsel | F15B 13/0402 |
| 11,268,621 | B2 * | 3/2022 | Kimpara | F16K 17/044 |
| 11,549,525 | B2 | 1/2023 | Gilling et al. | |
| 2007/0056632 | A1 | 3/2007 | Cheong | |
| 2012/0090690 | A1 * | 4/2012 | Andersson | E02F 9/2267 137/511 |

* cited by examiner

VARIABLE RELIEF CIRCUIT

CROSS-REFERENCE TO RELATED APPLICATIONS

The present application is based on, claims priority to U.S. Provisional Patent Application No. 63/346,528, filed on May 27, 2022, entitled "Systems and Methods for a Load Sense Circuit," which is incorporated herein by reference in its entirety.

BACKGROUND

The present disclosure relates generally to pressure relief circuits for hydraulic systems.

BRIEF SUMMARY

A relief circuit can be used with a hydraulic machine to provide pressure relief for one or more functions, for example, to limit a function pressure during operation. A relief circuit according to the present disclosure can be configured to allow for simultaneous and independent operation of functions at different relief pressure. For example, a first function can relieve at a first relief pressure and a second function can relieve at a second relief pressure that is higher than the first pressure. Such a relief circuit can be incorporated into, for example, a load sense circuit to allow the second, higher-pressure function to command the load sense signal while allowing the first, lower-pressure function to operate normally. Correspondingly, should the pressure from the second function drop below the pressure of the first function, the first function can command the load sense signal to maintain operation.

According to some aspects of the present disclosure, a relief circuit may include a main supply line, a first relief valve, and a second relief valve. The main supply line may include a first inlet and an outlet. The first relief valve may be connected to the main supply line. The first relief valve may be set to relieve at a first pressure. The second relief valve may also be connected to the main supply line. The second relief valve may be set to relieve at a second pressure higher than the first pressure. A second inlet may be provided between the first inlet and the first relief valve. In a first state, both the first inlet and the second inlet may be fluidly coupled to the first relief valve so that a pressure at the first inlet and a pressure at the second inlet may each relieve at the first pressure through the first relief valve. In a second state, the first inlet may be fluidly isolated from first relief valve so that the pressure at the first inlet may relieve at the second pressure through the second relief valve and the pressure at the second inlet may relieve at the first pressure through the first pressure relief valve.

In some non-limiting examples, a first control valve may be located between the first inlet and the first relief valve. The first control valve may operate between a first position that couples the first inlet to the first relieve valve and a second position that isolates the first inlet from the first relief valve.

In some non-limiting examples, a second control valve may be located downstream of the second relief valve. The second pressure at which the second relief valve is set to relieve may correspond to a sum of a pressure relief setting of the second relief valve and a pressure relief setting of the second control valve.

In some non-limiting examples, the first control valve may be a 2-position/2-way hydraulic valve. In some non-limiting examples, the first control valve may be solenoid operated. In some non-limiting examples, the second inlet may be coupled to the main supply line in each of the first state and the second state. In some non-limiting examples, the relief circuit may include a drain regulator circuit. The drain regulator circuit may be used to bleed fluid from the main supply line during each of the first state and the second state.

According to some aspects of the present disclosure, a relief circuit may include a main supply line, a first inlet, a second inlet, a first relief valve, a second relief valve and a first control valve. The first relief valve may be set to relieve at a first pressure. The second relief valve may be set to relieve at a second pressure higher than the first pressure. The first control valve may operate in both a first mode and a second mode. In the first mode, the first control valve may operate to fluidly couple the first inlet to the first relief valve. In the second mode, the first control valve may operate to isolate the first inlet from the first relief valve. The second inlet may be fluidly coupled to the first relief valve during operation of the first control valve in both the first mode and the second mode. The first inlet may be coupled to the second relief valve and disconnected from the first relief valve during the second mode.

In some non-limiting examples, the first control valve may be operated in either a first position or a second position to selectively isolate the first inlet from the first relief valve. In some non-limiting examples, the second inlet may be fluidly coupled to the main supply line during at least one of the first mode and the second mode. In some non-limiting examples, the second inlet may be fluidly coupled to the main supply line during both the first mode and the second mode. In some non-limiting examples, the second inlet may be fluidly coupled to the main supply line via a non-return valve which allows flow from the second inlet to the main supply line while inhibiting flow from the main supply line to the second inlet.

In some non-limiting examples, an electrohydraulic pressure regulating valve is arranged downstream from the second relief valve. In some non-limiting examples, operation of the first control valve in the first mode or the second mode is based on an energization of the electrohydraulic pressure regulating valve. In some non-limiting examples, the first control valve may be solenoid operated.

In some non-limiting examples, the relief circuit further includes a drain regulating circuit. The drain regulating circuit may bleed fluid from the first inlet or the second inlet. In some non-limiting examples, the drain regulating circuit may allow a regulated flow from the main supply line. In some non-limiting examples, the drain regulating circuit may allow regulated flow to bleed from the first inlet and the second inlet when a pressure at the second inlet is less than the first pressure According to some aspects of the present disclosure, a hydraulic system includes a load sense conduit including an inlet and an outlet. A first relief leg may be coupled to the load sense conduit. The first relief leg may include a first relief valve and a first control valve. The first relief valve may open at a first relief pressure. The first control valve may be coupled between the first relief valve and the load sense conduit. A second relief leg may be coupled to the load sense conduit. The second relief leg may include a second relief valve that may open at a second relief pressure that is greater than the first relief pressure. A first function that operates at a first function pressure may be coupled between the load sense conduit and the first control valve. A second function that operates at a second function pressure may be coupled between the first control valve and the first relief valve. When in a first position, the first control valve may limit the pressure from both the first function and from the second function. When in a second position, the first control valve may limit the pressure from the second function. When in the second position, the pressure from the first function may be limited by the second relief valve.

In some non-limiting example, the pressure of the first function and the pressure of the second function may be limited to the first relief pressure when the first control valve is in the first position. The pressure of the first function may be limited to the second relief pressure, and the pressure of the second function may be limited to the first relief pressure when the first control valve is in the second position. In some non-limiting examples, the first relief pressure may equal to a maximum second function pressure and the second relief pressure may be equal to a maximum first function pressure when the first control valve is in the second position.

In some non-limiting examples, the second relief leg may include a drain regulator circuit. The drain regulator circuit may bleed fluid from each of the first function and the second function when a pressure in the load sense conduit is less than the second relief pressure.

In some non-limiting examples, the first control valve may include a solenoid operated on/off valve. In some non-limiting examples, a load sense pressure of the second function may be communicated to the load sense conduit when the first control valve is in the second position.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The present disclosure will be better understood and features, aspects and advantages other than those set forth above will become apparent when consideration is given to the following detailed description thereof. Such detailed description makes reference to the following drawings.

DETAILED DESCRIPTION

Figure 1:
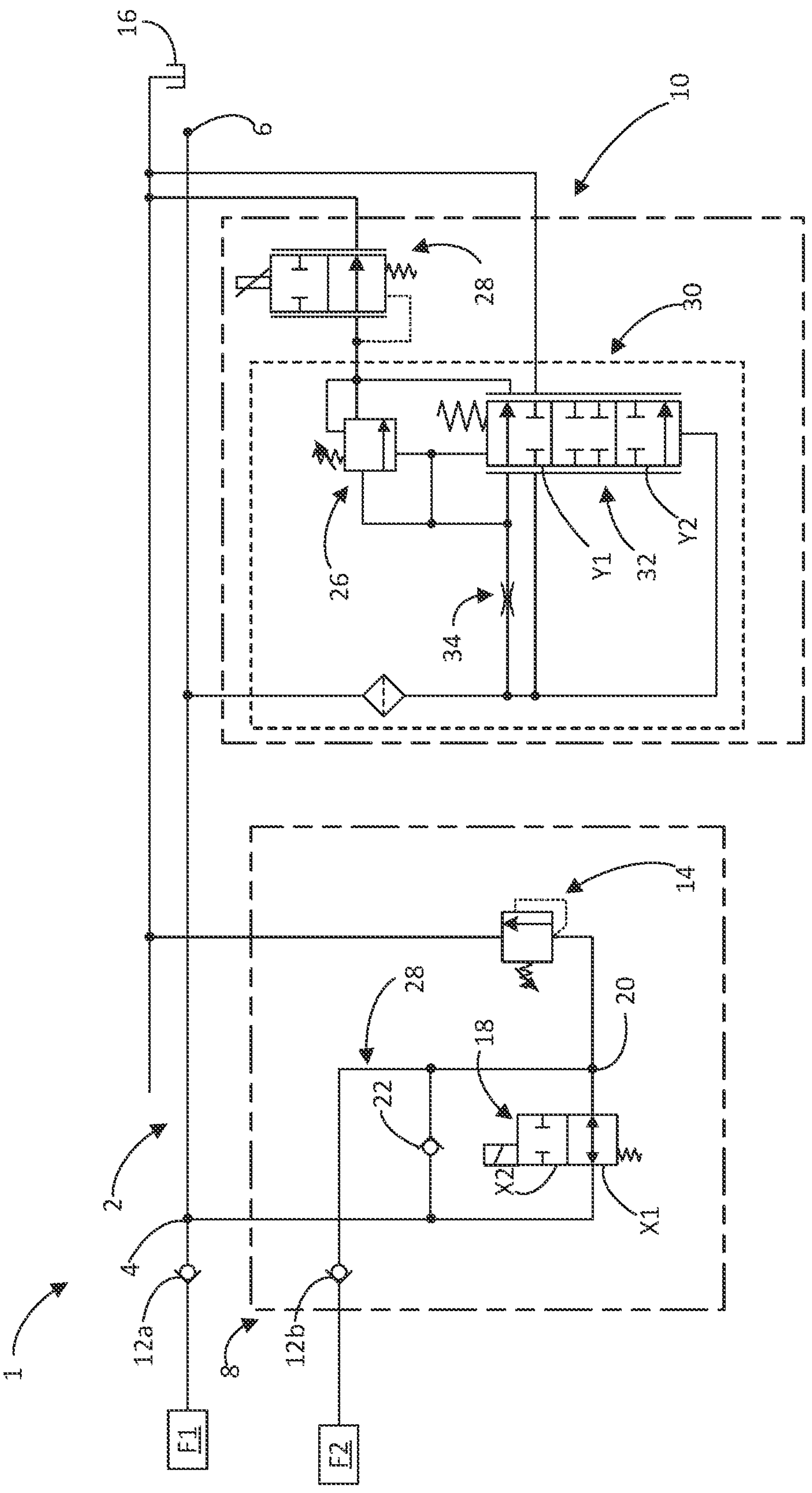
FIG. 1 is a schematic illustration of a non-limiting example of a relief circuit, according to aspects of the disclosure.

Before any aspects of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings, as well as fluid couplings.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

Hydraulic systems can be used to simultaneously operate different functions. For example, a hydraulic system of a skid steer, loader, or other hydraulic machine may be used to operate both a first function (e.g., standard function, for example, a bucket or boom function) and a second function (e.g., an auxiliary function, for example, an auger, a sweeper, a jackhammer, etc.). The functions operated by a hydraulic system may vary during different operational modes of the hydraulic system, such as for completing different work tasks using a variety of different functions or implements.

In some cases, different functions may require different operating pressures, and thus, it may be desirable to limit (e.g., prevent) each function from operating in excess of a predetermined pressure (i.e., a maximum operating pressure for each function). The maximum operating pressure of a function may be based on any number of different variables, including, but not limited to, the pressure/flow requirements of the function, manufacturer specifications, the pressure/flow requirements of other functions alongside which the function is operated, the physical construction of the function, etc. In various scenarios, the maximum operating pressure for a function may correspond to any pressure that is equal to, or less than, the highest pressure at which the function is capable of being operated. Accordingly, to limit a function from operating in excess of its maximum operating pressure, a hydraulic system may accordingly include a pressure relief valve that is set to relieve when pressure reaches the maximum operating pressure of that function.

Conventional relief systems can provide some ability to accommodate the different maximum operating pressures for various functions of a hydraulic system. For example, some conventional relief systems can be configured to be operated in both a first setting during which functions of the hydraulic system connected to the relief system relieve at a first relief pressure, as well as in a second setting during which functions of the hydraulic system connected to the relief system relieve at a second, different relief pressure. However, these conventional systems typically require that each and every function be operated at the same relief pressure, whether it be the first relief pressure or the second relief pressure. That is, conventional relief systems are typically only capable of relieving pressure at either the first relief pressure or the second relief pressure, such that all functions must operate with the same maximum operating pressure (e.g., at or below the same relief pressure).

In contrast to conventional relief systems, the relief circuit shown and described herein can accommodate different operating pressures of various functions of a hydraulic system that may be operated simultaneously during use of a hydraulic system. That is, a relief circuit according to the present disclosure can be configured to operate in a first mode, in which any connected functions operate with a first relief pressure, and a second mode, in which a first function can operate with a second relief pressure and a second function can operate at the first relief pressure. Correspondingly, a relief circuit can include a first relief valve configured to relieve at a first relief pressure and a second relief valve that is configured to relieve at a second pressure that is different from the first relief pressure. In some cases, the first relief pressure and/or the second relief pressure can be a variable pressure.

To allow for multiple relief pressures, a relief circuit can be configured to selectively operate in either a first state (e.g., a low pressure mode) or a second state (e.g., a high pressure mode). In the first state, the relief circuit can be configured so that both a first function and a second function that are coupled to a first relief valve relieve at a first relief pressure. In some cases, it is also possible that both the first and second functions can be coupled to a second relief valve with a second, higher relief pressure. However, because both the first function and the second function are coupled to the first relief valve, which has a lower relief pressure than the second relief valve, both the first function and the second function will relieve via the first relief valve at the first relief pressure during operation in the first state. Operation in the first state, can be desirable, for example, when the first function and the second function have the same maximum operating pressure, or when they should relieve at the same pressure.

In the second state, the relief circuit can be configured so that the second function is isolated from the second relief valve and coupled to the first relief valve to relieve at the first relief pressure, and the first function can be isolated from the first relief valve and coupled to the second relief valve to relieve at the second pressure, which may be greater than the first pressure. As a result, both the first function and second function can be operated simultaneously at different relief pressures. The relief circuit can be configured to operate in the second state when, for example, the first function and second function are configured to relieve at different relief pressures or have different maximum operating pressures.

To switch between the first and second states, a relief circuit can include a control valve configured to fluidly isolate the second function and first relief valve from the first function and second relief valve. The control valve can be operated based on a control signal. The control signal can be for example, an electronic signal. In both cases, the signal can be communicated to the control valve based upon an operational parameter, for example, a type or desired relief pressure of the second function.

In some cases, to accommodate the range of maximum operating pressures of different functions that may be connected to the relief circuit during different operational modes of a hydraulic system, the first relief valve and second relief valve are each optionally variable valves (i.e., the pressure at which each valve relieves may be varied based on the particular needs of a situation). Thus, in addition to allowing different functions to relieve at different pressures depending on whether the relief circuit is operated in the first state or the second state, the relief circuit can also allow for variation of the particular relief pressures at which different functions relieve during different operations of the relief circuit (i.e., during different operational modes of a hydraulic system).

For example, the relief circuit can optionally incorporate an electrohydraulic pressure regulating valve ("EPRV"), or other control valve, downstream from a second relief valve. Incorporating an EPRV between the second relief valve and a tank can allow the first function to relieve at a higher pressure than with the second relief valve (e.g., to relieve at a pressure that exceeds the second relief pressure of the second relief valve). In operation, the EPRV effectively adds to the relief pressure of the second relief valve (i.e., the EPRV adds to the second relief pressure at which the second relief valve is set to relieve) so that the second function relieves at a pressure that is equal to the sum of the second relief pressure and a third relief pressure of the EPRV. The EPRV can be configured so that the third relief pressure can be an infinitely variable pressure between a minimum pressure and a maximum pressure.

In some non-limiting examples, the relief circuit may operate as a load sense circuit, with an outlet of a main supply line of the relief circuit thus acting as load sense conduit, and being coupled to a load sense system. Because the first inlet is coupled to the main supply line, a load sense pressure from the first function can be transmitted to the load sense system during operation of the relief circuit in each of the first state and the second state.

As discussed in detail below, the second inlet is coupled to the relief circuit between the first control valve and the first pressure relieve valve. Thus, to ensure that a load sense pressure of the second function is also capable of being transmitted to the load sense system—such that both the operation of the first function and the operation of the second function are capable of commanding operation of a pump of the hydraulic system—the relief circuit can be configured to provide communication between the second inlet and the main supply line in each of the first state and the second state.

In some cases, to avoid pressure from becoming trapped within the relief circuit (e.g., when operation of the first function or second function switches from an active state to a neutral state), the relief circuit optionally may also be configured to allow fluid to bleed during operation of the relief circuit in each of the first state and the second state. Such implementation can be used to relieve pressure in, for example, a load sense line when the pressure is below both the first relief pressure and the second relief pressure. It is appreciated, that a small bleed of fluid can also occur during operation of a function.

FIG. 1 illustrates a non-limiting example of a relief circuit 1 according to aspects of the disclosure. As generally described below, the relief circuit 1 can be configured to selectively allow a first function F1 and a second function F2 to be operated with the same relief pressure or different relief pressures. The relief circuit 1 can be advantageously used with a load sense circuit, by allowing pressures from the first function F1 and the second function F2 to be isolated from one another, and more specifically to isolate a low pressure function (e.g., the second function F2) from a load sense conduit while maintaining fluid communication between a higher pressure function (e.g., the first function F1) and the load sense conduit. This allows the low pressure function to continue to relieve at a low pressure, while allowing the higher commanded pressure of the high pressure function to be communicated to the load sense conduit (e.g., to command a pump). However, it should also be appreciated that the relief circuit 1 can also be employed in other types of systems.

The relief circuit 1 can include a main line 2 (e.g., a load sense conduit) that extends between a first fluid inlet 4 (e.g., a first inlet) and a downstream outlet 6 (e.g., a pump and/or or a load sense system). The relief circuit 1 can further include a first relief leg 8 coupled to the main line 2 and a second relief leg 10 coupled to the main line 2, between the first relief leg 8 and the outlet 6. The first relief leg 8 can be configured to relieve pressure at a first relief pressure and the second relief leg 10 configured to relieve pressure at a second relief pressure.

The first relief leg 8 can include a first relief valve 14 configured to relieve pressure at the first relief pressure. An outlet of the first relief valve 14 can be coupled to a tank 16. In addition, the first relief leg 8 can also include a control valve 18 (e.g., a first control valve) coupled between the first fluid inlet 4 and the first relief valve 14 (i.e., the control valve 18 is coupled between the main line 2 and the first relief valve 14). The control valve 18 is operable between a first position X1 (e.g., a first mode) and a second position X2 (e.g., a second mode) to selectively couple the main line 2 to the first relief valve 14. In the first position X1, the control valve 18 can couple the main line 2 to be in fluid communication with the first relief valve 14. In the second position X2, the control valve 18 can isolate the main line 2 from the first relief valve 14 and prevent pressure/flow from being communicated therebetween.

In addition, the control valve 18 can also selectively couple the first function F1 to the second function F2. To that end, the first function F1 can be coupled between the main line 2 and the control valve 18 (e.g., at the first fluid inlet 4) and the second function F2 can be coupled between the control valve 18 and the first relief valve 14 (e.g., a second (fluid) inlet 20). Accordingly, in the first state, both the first function F1 and the second function F2 can be coupled to the first relief valve 14, and thus, can both relieve at the first relief pressure. However, in the second state, the first function F1 can be isolated from the first relief valve 14 while the second function remains coupled to the first relief valve 14. As a result, second function can continue to relieve through the first relief valve 14 as necessary, while the first function F1 may be fully or partially restricted from relieving through the first relief valve 14. Correspondingly, a pressure differential can occur across the control valve 18 (e.g., to allow the first function F1 to be at a higher pressure than the second function F2).

In various non-limiting examples, an optional non-return valve 12*a* (e.g., a check valve or other unidirectional flow control element) can be coupled between the first function F1 and the first fluid inlet 4. The optional non-return valve 12*a* may allow for flow from the first function F1 to the main line 2, while preventing flow from the main line 2 to the first function F1 (e.g., in the event that an operating pressure of the second function F2 exceeds an operating pressure of the first function F1). Similarly, or alternatively, an optional non-return valve 12*b* (e.g., a check valve or other unidirectional flow control element) can be coupled between the second function F2 and the second (fluid) inlet 20. The optional non-return valve 12*b* may allow for flow from the second function F2 to the main line 2, while preventing flow from the main line 2 to the second function F2 (e.g., in the event that an operating pressure of the first function F1 exceeds an operating pressure of the second function F2).

Figure 2:
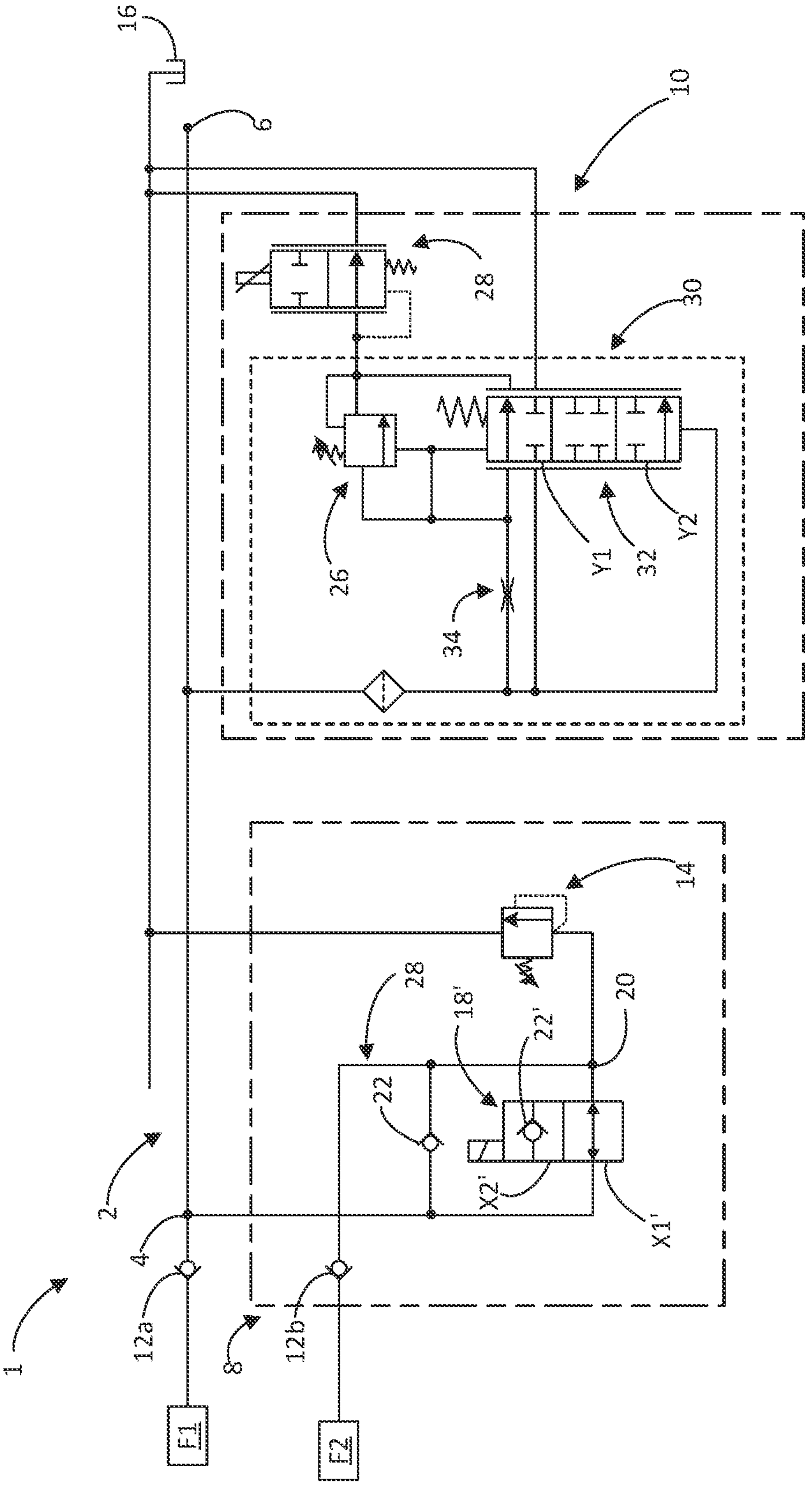
FIG. 2 is a schematic illustration of a non-limiting example of a relief circuit, according to aspects of the disclosure.

In various non-limiting examples, an optional check valve 22 (or other unidirectional flow control element, such as, e.g., a non-return valve) can be coupled between the main line 2 and the second function F2, to control flow therebetween. As illustrated in FIG. 1, the check valve 22 can be a separate element arranged in parallel with the control valve 18, and/or as illustrated in FIG. 2, a check valve 22' can be integrated into the control valve 18'. One, or both, of the optional check valves 22, 22' can allow fluid to flow from the second function F2 to the main line 2 when the pressure of the second function F2 exceeds the pressure in the main line 2, which can be beneficial to allow the second function F2 to drain to tank, as generally described below. In such scenarios, the check valve 22, 22' can allow flow from the second function F2 to the main line 2 when the control valve 18, 18' is in the second position X2, X2'. Conversely, when the pressure in the main line 2 is greater, the check valve 22, 22' can close, to allow the first function F1 and the second function F2 to operate at different pressures.

Accordingly, still referring to FIG. 1, the second relief leg 10 can be configured to provide pressure relief. To that end, the second relief leg 10 can include a second relief valve 26 that can be configured to relieve pressure at the second relief pressure. An outlet of the second relief valve 26 is coupled to the tank 16. In some non-limiting examples, the second relief leg 10 can further include an electronic pressure relief valve (EPRV) 28, or other second control valve, downstream from the second relief valve 26 (e.g., between the second relief valve 26 and tank 16). Such an arrangement allows the second relief valve 26 to be set to relieve at an effective relief pressure that exceeds the normal operating range of the second relief valve 26 (e.g., the second relief pressure). For example, arranging an EPRV 28 defined by an operating range of between about 0 bar and 100 bar downstream relative to a second relief valve 26 that normally has a maximum pressure relief setting of 250 bar allows the second relief valve 26 to relieve at a pressure of up to 350 bar. The EPRV 28 can be configured to provide for a discrete set of effective second relief pressures or to provide for an infinitely variable range of pressures. Additional details related to the use of a control valve (such as, e.g., the EPRV 28) to increase the maximum pressure at which a relief valve (such as, e.g., the second relief valve 26) is provided in U.S. Pat. No. 11,549,525, titled ELECTRONICALLY ADJUSTABLE PRESSURE COMPENSATED FLOW CONTROL WITH PRESSURE LIMITING RELIEF VALVE, which is incorporated herein by reference in its entirety.

In various non-limiting examples, the second relief valve 26 is provided as part of an optional drain regulator circuit 30. As described in more detail in U.S. Pat. No. 11,549,525, in some such scenarios the drain regulator circuit 30 includes a flow regulation control valve 32 that is located downstream from a control orifice 34. The second pressure relief valve 26 controls operation of the flow regulation control valve 32 between a first mode Y1 and a second mode Y2.

When in the first mode Y1, the flow regulation control valve 32 couples an upstream portion thereof to a downstream portion thereof via the control orifice 34. Accordingly, during the first mode Y1 communication through the flow regulation control valve 32 is metered by the restriction provided by the control orifice 34. During the second mode Y2, the flow regulation control valve 32 couples the upstream and downstream portions thereof via a connection that does not include the control orifice 34. Accordingly, communication through the flow regulation control valve 32 is not restricted by the control orifice 34 during operating of the flow regulation control valve 32 in the second mode Y2. The downstream portion of the flow regulation control valve 32 may be connected to the tank 16 during both the first mode Y1 and the second mode Y2.

Continuing, and as generally mentioned above, the relief circuit 1 can selectively operate in either a first state or a second state to selectively allow the first function F1 and a second function F2 to relieve at different relief pressures. The relief circuit 1 can operate in the first state in which both a first function F1 and a second function F2 relieve at the same pressure, and more specifically, through the first relief valve 14. In some cases, the first relief valve 14 can have a first relief pressure corresponding to an operational parameter of the system, for example, a maximum operating pressure of each of the first function F1 and second function F2, or a desired relief pressure of the at least one of the first function F1 and second function F2.

During the first state, the control valve 18 is set to operate in the first position X1. As discussed above, when operated in the first position X1 the control valve 18 connects the main line 2 and first function F1 to the first relieve valve 14. Because the second function F2 is coupled to the first relief valve 14 independent from the operation of the control valve 18, the second function F2 is also connected to the first relief valve 14 during the first state. Accordingly, both the first function F1 and the second function F2 are coupled to the first relief valve 14 during the first state. Thus, during the first state, both the first function F1 and the second function F2 can relieve pressure via the first relief valve 14 when an operating pressure of either the first function F1 or the second function F2 reaches (or exceeds) the relief pressure of the first relief valve 14.

The relief circuit 1 can selectively operate in the second state when it is desired to have different, simultaneously operated functions relieve at different pressures (i.e., when different simultaneously operated functions of a hydraulic system have different maximum operating pressures). In the second state, the control valve 18 is operated in the second position X2 to isolate the main line 2, first function F1, and second relief valve 26 from the second function F2 and the first relief valve 14. This allows the first function F1 and second function F2 to be operated simultaneously with different relief pressures. More specifically the first function can relieve at a higher pressure than the second function F2. When this occurs, a pressure differential occurs over the control valve 18 and the check valve 22, the latter of which is kept closed by the pressure differential, keeping the first function F1 and second function F2 isolated and independent from one another.

Accordingly, each of the first function F1 and the second function F2 can relieve independently from one another at their desired relief pressures. Specifically, because the control valve 18 isolates pressure of the first function F1 from the first relief valve 14 in the second position X2, the first function F1 will not relieve when the operating pressure of the second function F2 reaches the first pressure (i.e., the pressure to which the first relief valve 14 is set). Instead, the first function F1 will not relieve until an operating pressure of the first function F1 reaches or exceeds the second relief pressure of the second relief valve 26. Upon reaching the second relief pressure, the first function F1 will then relieve via the second relief valve 26. In some cases, the first function F1 will relieve upon reaching the effective relief pressure set by the second relief valve 26 and the EPRV 28.

During operation of the relief circuit 1, the pressure in the main line 2 (e.g., a load sense conduit) will be equal to the higher of the operating pressure of the first function F1 and the operating pressure of the second function F2. When in the first state, the pressure of the first function F1 and the pressure of the second function F2 are each limited to the first relief pressure of the first relief valve 14. As both the first function F1 and second function F2 will relieve when an operating pressure of either the first function F1 or second function F2 reaches the first relief pressure, the pressure in the main line 2 will corresponding not exceed the first relief pressure of the first relief valve 14 during the first state. However, because the first function F1 is isolated from the first relief valve 14 during the second state, an operating pressure of the first function F1 may exceed the first relief pressure during the second state. Thus, irrespective of whether an operating pressure of the second function F2 reaches the first relief pressure of the first relief valve 14, the first function F1 may communicate a higher operating pressure to main line 2 during the second state. Thus, the first function F1 may operate irrespective of the operation of the second function F2 (e.g., irrespective of whether an operating pressure of the second function F2 reaches, or exceeds the first relief pressure of the first relief valve 14). Correspondingly, the second function F2 will not relieve when the operating pressure of the first function F1 reaches the second pressure (i.e., the pressure to which the second relief valve 26 is set). Instead, the second function F2 will not relieve until an operating pressure of the second function F2 reaches, or exceeds, the first relief pressure of the first relief valve 14. Upon reaching the first relief pressure, the second function F2 will then relieve via the first relief valve 14. Thus, the operating pressure of the second function F2 will be limited by the first relief valve 14 irrespective of the operating pressure of the first function F1. During operation of the relief circuit 1 in the second state, the second function F2 may operate irrespective of the first function F1 (e.g., irrespective of whether an operating pressure of the first function F1 reaches, or exceeds the second relief pressure of the second relief valve 26).

The transition of the control valve 18 between the first position X1 and the second position X2 may be effectuated using and/or based on number of different inputs (e.g., one or more operational parameters. For example, in some cases, transition of the control valve 18 between the first position X1 and the second position X2 can occur based on a manual user input as to whether to operate the relief circuit 1 in the first state or the second state. In other non-limiting examples, such as, e.g., representatively illustrated in FIG. 2, the control valve 18' comprises a solenoid valve (or another type of electronically controlled valve that can receive an electronic signal sent from an operator, the hydraulic machine, an electronic controller, etc.) that is switched between positions X1', X2' based on an operating pressure requirement of the first function F1. The solenoid valve may receive a first signal configured to cause a transition of the control valve 18' to the first position X1' when a maximum operating pressure of the first function F1 is equal to that of the second function F2, and may receive a second signal configured to cause a transition of the control valve 18' to the second position X2' when a maximum operating pressure of the first function F1 is greater than that of the second function F2. For example, when the first function F1 requires an operating pressure greater than the first relief pressure, the EPRV 28 can receive a corresponding signal (e.g., from an operator, the hydraulic machine, or the second function F2), which can energize the EPRV 28. For example, according to one non-limiting scenario, a signal sent to the EPRV 28 to initiate energization may simultaneously also be relayed to the control valve 18' to actuate the second position X2'. As a deenergization of the EPRV 28 may signal that it is no longer desired to have the first function F1 relieve via the second relief valve 26 (i.e., that it is no longer desired to operate the relief circuit 1 in the second state), a deenergization signal sent to the EPRV 28 may similarly be relayed to the control valve 18' to actuate the first position X1'.

Relatedly, when configured as part of a load sense circuit, the relief circuit can allow both the first function F1 and the second function F2 to control the pressure on the main line 2 (i.e., the load sense conduit), for example, to control operation of a pump coupled to the outlet 6. In particular, in the first state, the control valve 18 is open so that both the pressure of the first function and the second function can be communicated on the main line 2. Accordingly, the highest of the first function pressure and the second function pressure will be communicated to the pump to control a fluid output thereof. In the second state, when the first function pressure is greater than the second function pressure, the check valve 22, 22' will be closed by the pressure differential thereacross so that only the first function pressure is communicated on the main line 2 to control a fluid output of the pump. However, if the second function pressure is greater than the first function pressure, for example, when the first function F1 is not in use or operating under a low load condition, the pressure differential across the check valve 22, 22' will allow the check valve 22, 22' to open and allow the second function pressure to be communicated on the main line 2 to control a fluid output of the pump. Because of the pressure differential, the first function F1 will effectively remain isolated from the first relief valve 14 even while the check valve 22, 22' is open. Thus, inclusion of the check valve 22, 22' of the relief circuit 1 can allow both the first function F1 and the second function F2 to command a load sense pressure in both the first state and the second state.

Correspondingly, the check valve 22, 22' can also allow the first function F1 and the second function to drain when the pressures drop below the first and second relief pressures, which allows pressure on the main line 2 to reduce below the first and second relief pressures. In particular, such a drain function can be important in load sense applications by allowing pressure on the main line 2 to reduce to zero when no function is being used, or when going from a high load operation to a low load operation.

Accordingly, as discussed above, in various non-limiting examples the relief circuit 1 includes a drain regulator circuit 30. The optional drain regulator circuit 30 allows a regulated flow from the main supply 2 to tank 16 whenever the main supply 2 pressure is less than the second relief pressure of the second relief valve 26.

For example, in the first state, when both the first function pressure and second function pressure drop below the first function pressure, both the first relief valve 14 and second relief valve 26 will remain closed. Accordingly, fluid can flow through the control valve 18 or the check valve 22, and along the main line 2 to the drain regulator circuit 30 (e.g., with the drain regulator circuit 30 in the first mode Y1), where it can be discharged to tank 16, thus resulting in the pressure in the main line 2 (e.g., a load sense conduit) decaying to a pressure of the tank 16 It is appreciated that, because the control orifice 34 meters communication through the flow regulation control valve 32 during operation in the first mode Y1, the amount of flow through the drain regulation control valve 32 is smaller than the flow capability of the first function F1 and second function F2 into the main line 2, and the flow that is released from the relief circuit 1 in such scenarios will thus be regulated.

Similarly, in the second state, when both the pressure of the first function F1 and the pressure of the second function F2 drop below the first relief pressure, the first relief valve 14 and second relief valve 26 will remain closed, and fluid can flow through the check valve 22, and along the main line 2 to the drain regulator circuit 30 to be discharged to tank 16. However, when the first function pressure is greater than the first relief pressure but less than the second relief pressure (i.e., between the first and second relief pressures), the second function will be isolated from the main line 2 by the check valve 22, 22', and only the first function will drain to the tank 16 via the drain regulator circuit 30. Accordingly, the drain regulator circuit 30 always drains the main line 2 by allowing a regulated flow from the main line 2 to the tank 16 whenever pressure of the main line 2 is less than the second relief pressure of the second relief valve 26.

As noted previously, it will be appreciated by those skilled in the art that while the disclosure has been described above in connection with particular non-limiting examples and examples, the disclosure is not necessarily so limited, and that numerous other non-limiting examples, examples, uses, modifications and departures from the non-limiting examples, examples and uses are intended to be encompassed by the claims attached hereto.

What is claimed is:

1. A relief circuit comprising:

a main supply line including a first inlet and an outlet;

a first relief valve connected to the main supply line, the first relief valve being configured to relieve at a first pressure;

a second relief valve connected to the main supply line, the second relief valve being configured to relieve at a second pressure higher than the first pressure; and a second inlet provided between the first inlet and the first relief valve;

wherein, in a first state, both the first inlet and the second inlet are fluidly coupled to the first relief valve so that a pressure at the first inlet and a pressure at the second inlet each relieve at the first pressure through the first relief valve; and wherein, in a second state, the first inlet is fluidly isolated from first relief valve so that the pressure at the first inlet relieves at the second pressure through the second relief valve and the pressure at the second inlet relieves at the first pressure through the first pressure relief valve.

2. The relief circuit of claim 1, further comprising a first control valve located between the first inlet and the first relief valve, the first control valve operable between a first position that couples the first inlet to the first relief valve and a second position that isolates the first inlet from the first relief valve.

3. The relief circuit of claim 2, further comprising a second control valve located downstream of the second relief valve, wherein the second pressure at which the second relief valve is configured to relieve corresponds to a sum of a pressure relief setting of the second relief valve and a pressure relief setting of the second control valve.

4. The relief circuit of claim 3, wherein the first control valve is a 2-position, 2-way hydraulic valve.

5. The relief circuit of claim 4, wherein the first control valve is solenoid operated.

6. The relief circuit of claim 1, wherein the second inlet is coupled to the main supply line in each of the first state and the second state.

7. The relief circuit of claim 6, further comprising a drain regulator circuit configured to bleed fluid from the main supply line during each of the first state and the second state.

8. A relief circuit comprising:

a main supply line;

a first inlet;

a second inlet;

a first relief valve configured to relieve at a first pressure;

a second relief valve configured to relieve at a second pressure higher than the first pressure; and a first control valve operable in a first mode and a second mode;

wherein, in the first mode, the first control valve operates to fluidly couple the first inlet to the first relief valve;

wherein, in the second mode, the first control valve operates to isolate the first inlet from the first relief valve;

wherein the second inlet is fluidly coupled to the first relief valve during operation of the first control valve in both the first mode and the second mode; and wherein, the first inlet is coupled to the second relief valve during the first and second mode.

9. The relief circuit of claim 8, wherein the first control valve is configured to operate between a first position and a second position to selectively isolate the first inlet from the first relief valve.

10. The relief circuit of claim 9, wherein the second inlet is fluidly coupled to the main supply line during at least one of the first mode and the second mode.

11. The relief circuit of claim 10, wherein the second inlet is fluidly coupled to the main supply line during both the first mode and the second mode.

12. The relief circuit of claim 8, wherein an electrohydraulic pressure regulating valve is arranged downstream from the second relief valve.

13. The relief circuit of claim 12, wherein operation of the first control valve in the first mode or the second mode is based on an energization of the electrohydraulic pressure regulating valve.

14. The relief circuit of claim 13, wherein the first control valve is solenoid operated.

15. The relief circuit of claim 8, further including a drain regulating circuit configured to allow a regulated flow from the main supply line.

16. A hydraulic system, comprising:

a load sense conduit including an inlet and an outlet;

a first relief leg coupled to the load sense conduit, the first relief leg including a first relief valve configured to open at a first relief pressure, and a first control valve coupled between the first relief valve and the load sense conduit;

a second relief leg coupled to the load sense conduit, the second relief leg including a second relief valve configured to open at a second relief pressure that is greater than the first relief pressure;

a first function coupled between the load sense conduit and the first control valve, the first function configured to operate at a first function pressure; and a second function coupled between the first control valve and the first relief valve, the second function configured to operate at a second function pressure, wherein, with the first control valve in a first position both the first function pressure and the second function pressure are limited to the first relief pressure, and wherein, with the first control valve in a second position the second function pressure is limited to the first relief pressure and the first function pressure is limited to the second relief pressure.

17. The hydraulic system of claim 16, wherein the first relief pressure is equal to a maximum second function pressure and the second relief pressure is equal to a maximum first function pressure when the first control valve is in the second position.

18. The hydraulic system of claim 16, wherein the second relief leg includes a drain regulator circuit configured to bleed fluid from each of the first function and the second function when a pressure in the load sense conduit is less than the second relief pressure.

19. The hydraulic system of claim 18, wherein the first control valve includes a solenoid operated on/off valve.

20. The hydraulic system of claim 18, wherein a load sense pressure of the second function is communicated to the load sense conduit when the first control valve is in the second position.

* * * * *